UNITED STATES PATENT OFFICE.

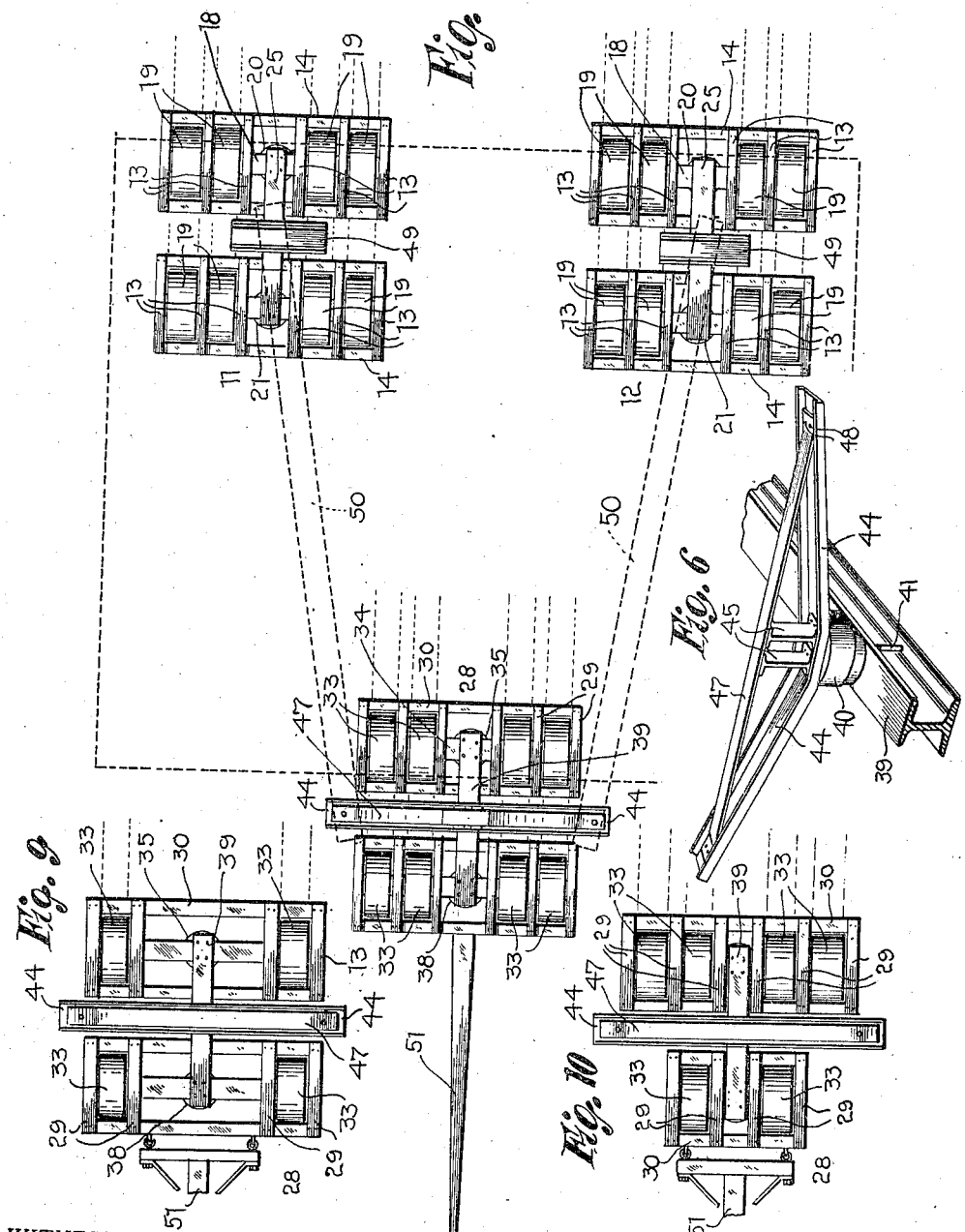

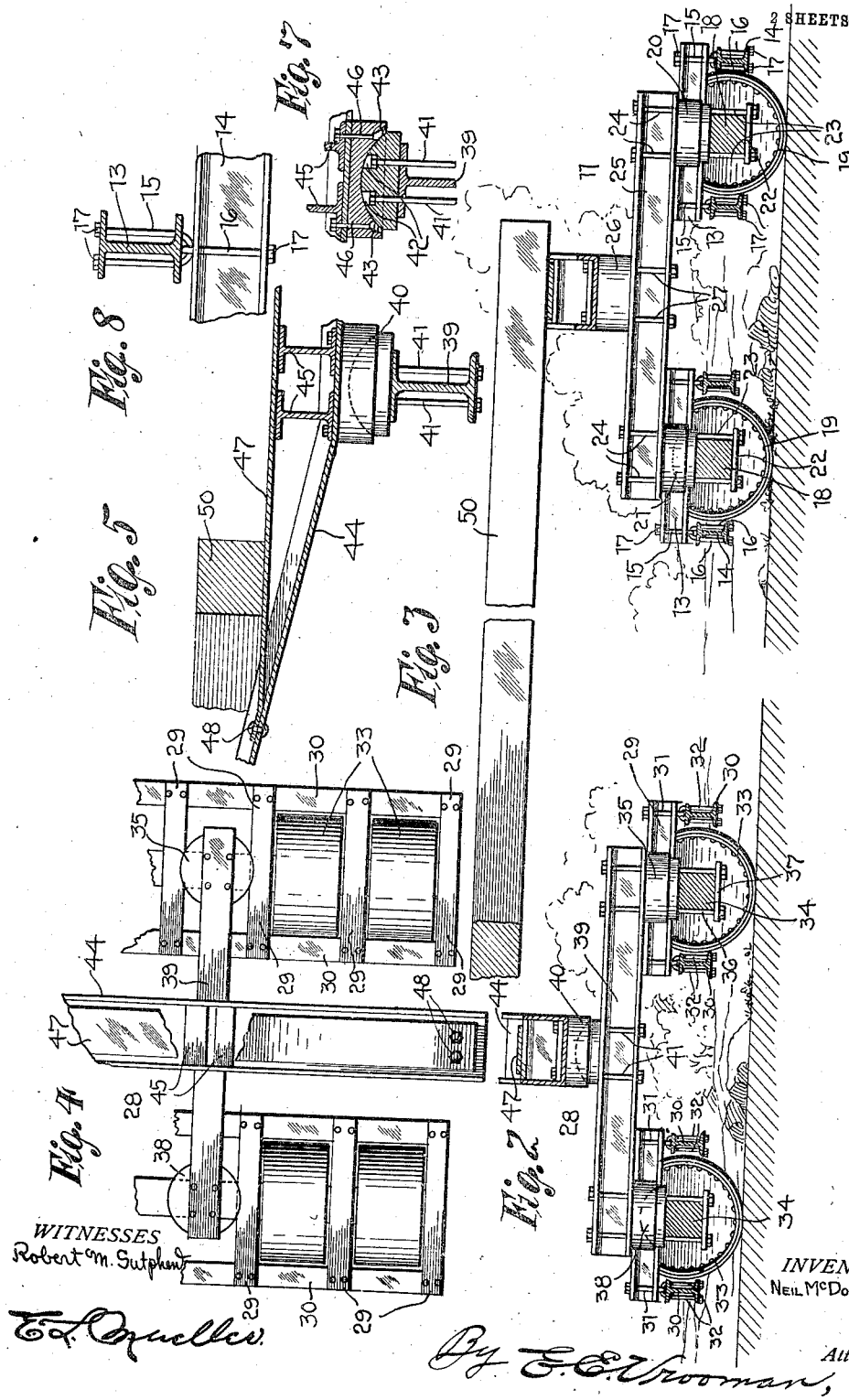

NEIL McDOUGALL, OF MINOT, NORTH DAKOTA.

TRUCK.

1,049,252.

Specification of Letters Patent. Patented Dec. 31, 1912.

Application filed August 26, 1911. Serial No. 646,228.

*To all whom it may concern:*

Be it known that I, NEIL McDOUGALL, a citizen of the United States, residing at Minot, in the county of Ward and State of North Dakota, have invented certain new and useful Improvements in Trucks, of which the following is a specification, reference being had therein to the accompanying drawing.

This invention relates to a device for removing houses from one place to another and has for its object to provide a device of the class mentioned that will be strong, compact and efficient in practice.

The invention contemplates providing a plurality of trucks, which are mainly constructed of I-beams made of suitable material, having a plurality of wheels journaled therein and also carrying means for resting the house thereon. A front truck is provided that carries a central transverse pivoted supporting beam which permits of the under portion of the truck being rotated without necessitating the moving of the house on said front truck.

In carrying out the objects of the invention generally stated above, it will be understood, of course, that the essential features thereof are susceptible of changes in details and structural arrangements, preferred and practical embodiments being shown in the accompanying drawings, wherein:—

Figure 1 is a top plan view constructed in accordance with this invention. Fig. 2 is a longitudinal sectional view of the front truck. Fig. 3 is a longitudinal sectional view of one of the rear trucks showing a house supporting timber resting thereon. Fig. 4 is a fragmentary top plan view of the front truck. Fig. 5 is a fragmentary longitudinal sectional view of the central supporting beam carried by the front truck and also the pivot bolster used for supporting said beam. Fig. 6 is a fragmentary perspective view of the central supporting beam and the support therefor. Fig. 7 is a fragmentary vertical sectional view of the pivot bolster used in connection with this invention. Fig. 8 is a sectional view showing means for connecting the longitudinal and transverse I-beams which comprise the body of the truck, the longitudinal beam being shown in section. Fig. 9 is a modified form of the front truck showing four wheels used in connection therewith. Fig. 10 is a modified form of the front truck showing six wheels used in connection therewith.

Referring to the accompanying drawings by numerals it will be seen that the invention comprises a plurality of spaced rear trucks 11 and 12. Each of these trucks comprises a number of longitudinally extending I-beams 13 and also a number of transverse I-beams 14 which are connected to said longitudinal I-beams by means of substantially U-shaped links 15 and 16. Each of said links is passed through the flanges of said I-beams and secured thereto by means of nuts 17 and have their closed ends in interlocking position.

An axle 18 is supported in both the front and rear of the trucks 11 and 12 and has journaled thereon a plurality of wheels 19 which are interposed between the longitudinal beams 13 of said truck. A rigid rear bolster 20 and a pivot front bolster 21 are securely mounted upon said axles between their ends by means of the plates 22 and the bolts 23 which have their inner ends securely fastened within said bolsters. Mounted upon the bolsters 20 and 21 and secured thereto by means of bolts 24 is a longitudinally extending I-beam 25. Between the ends of said I-beam 25 and between the front and rear portions of the truck there is a bolster 26 which is securely fastened to said I-beam by means of the bolts 27. The bolster 21 is pivoted so as to permit of a free movement of the front portion of each truck when traveling over rough ground.

Referring now to the front truck 28 it will be seen that this truck also comprises a plurality of longitudinal I-beams 29 and transverse beams 30 connected thereto by means of the links 31 and 32 such as have been specifically described in connection with the rear trucks. A plurality of wheels 33 are journaled upon the axles 34 and are interposed between said longitudinal beams. A rigid bolster 35 is securely mounted upon the rear axle of the front truck by means of the bolts 36 and plate 37. A pivot bolster 38 is secured upon the front axle of said truck and a longitudinally extending I-beam 39 is mounted upon the bolsters 35 and 38. Centrally disposed on the upper side of the member 39 is a projection having a convexed upper surface and on this convexed upper surface rests a socket 40. There is thus provided a ball and socket joint, the parts being held in position by bolts 41 and 46, passing through respective parts, and the bolts 41 have their heads in recesses 42 while the bolts 46 have their heads resting in recesses 43. A channel bar 44 rests upon the top of the socket 40 and extends transversely of the I-beam 39 and is bent upwardly at each end from its central portion. A pair of supporting braces 45 are rigidly secured to the central portion of the channel bar 44 by means of the bolts 46 which engage the flanges of the braces 45 and pass through the socket 40 and have their heads countersunk in their recess 43. A supporting plate 47 has its extremities bent at the same angle as the ends of the channel bar 44 and is secured to said beam by means of the rivets 48. Said supporting plate 47 also engages the top of the brace 45. The transverse supports 49 of the rear trucks are similar in construction to those used in connection with the front truck, but are made shorter as it is only necessary to support one end of the supporting timbers 50 thereon.

In Figs. 1, 3 and 5 of the drawings supporting timbers are shown resting upon the transverse supports of the front and rear trucks and extend diagonally relative to the house which is mounted on said timbers.

In the modified form shown in Figs. 9, and 10 the construction and arrangement of the longitudinal transverse-I-beams together with the transverse supporting beams are the same as in the preferred form, the only difference being in the use of the number of wheels in connection with the truck. A tongue 51 is secured to a portion of the front truck for the purpose of attaching animals thereto for rolling a house from one place to another.

Having thus described the invention, what is claimed, is:—

1. A house moving truck including a longitudinally extending I-beam carried thereby, a pivot bolster on said I-beam, a transversely extending channel bar secured to said bolster and a supporting plate carried by said channel bar.

2. A house moving truck including a rigid bolster carried by the rear of said truck, a pivot bolster carried by the front thereof, a longitudinally extending I-beam carried by said bolsters, a pivot bolster centrally located upon said I-beam, a transversely extending channel bar secured to the last mentioned pivot bolster, said bar having its ends extending upwardly at an angle to the central portion thereof, braces carried by said central portion, and a supporting plate resting upon said braces and secured to said channel bar.

In testimony whereof I hereunto affix my signature in presence of two witnesses.

NEIL McDOUGALL.

Witnesses:
 WILLIAM MURRAY,
 PETER FERGELSO.